United States Patent [19]
Robertson et al.

[11] Patent Number: 5,377,492
[45] Date of Patent: Jan. 3, 1995

[54] CONVEYOR SYSTEM FOR CHILLING FOOD PRODUCTS

[75] Inventors: Thomas W. Robertson; David A. Johnson, both of Metairie, La.

[73] Assignee: The Laitram Corporation, Harahan, La.

[21] Appl. No.: 176,964

[22] Filed: Jan. 3, 1994

[51] Int. Cl.⁶ .................... F25D 13/06; F25D 17/02
[52] U.S. Cl. ............................ 62/63; 62/64; 62/65; 62/374; 62/375
[58] Field of Search ............ 62/63, 64, 65, 374, 62/375, 376

[56] References Cited

U.S. PATENT DOCUMENTS

| | | | |
|---|---|---|---|
| 2,942,429 | 6/1960 | Van Dolah et al. | 62/375 X |
| 3,004,407 | 10/1961 | Morris, Jr. | 62/374 |
| 3,097,501 | 7/1963 | Pappas | 62/375 X |
| 3,164,967 | 1/1965 | Marshall | 62/375 X |
| 3,482,417 | 12/1969 | Davis et al. | 62/375 |
| 3,498,208 | 3/1970 | Longe et al. | 99/234 |
| 4,008,580 | 2/1977 | Heber et al. | 62/376 |
| 4,030,898 | 6/1977 | Morita | 62/375 X |
| 4,475,351 | 10/1984 | Klee | 62/63 |
| 4,719,760 | 1/1988 | Takayuki | 62/65 |
| 4,796,435 | 1/1989 | Mattson | 62/63 |
| 4,827,727 | 5/1989 | Caracciolo | 62/63 |
| 4,955,209 | 9/1990 | Smith | 62/380 |
| 5,000,012 | 3/1991 | Lofkvist | 62/376 |
| 5,184,471 | 2/1993 | Losacco et al. | 62/63 |

*Primary Examiner*—Christopher Kilner
*Attorney, Agent, or Firm*—Laurence R. Brown

[57] ABSTRACT

Food product chilling apparatus is afforded herein comprising an elongated water tank and a modular movable belt conveyer unit that carries warm food products through water for chilling. A superstructure and hoist system lifts the conveyor unit out of the water for servicing. Cooling water is recirculated and rechilled in a cooling method that controls the temperature of the efflux water from the cooling tank. The influx chilling water is distributed in a plurality of parallel flow paths incrementally chilling the product at various stations along the conveyor belt path to reduce the average cooling time for the processed products. By standardizing the efflux water temperature at the various stations at a few degrees Fahrenheit above the influx water, a thermally efficient cooling system is provided. Each of the cooling stations is provided with weir height control means to optimize the cooling rate along the length of the conveyor belt. By transverse flow of chilling water across the conveyor belt path, a turbulence is created that further accelerates cooling of the product. The apparatus and method of this invention is particularly adapted to the cooling of steam cooked food products, such as lobster and seafood, delivered directly from the cooker.

12 Claims, 3 Drawing Sheets

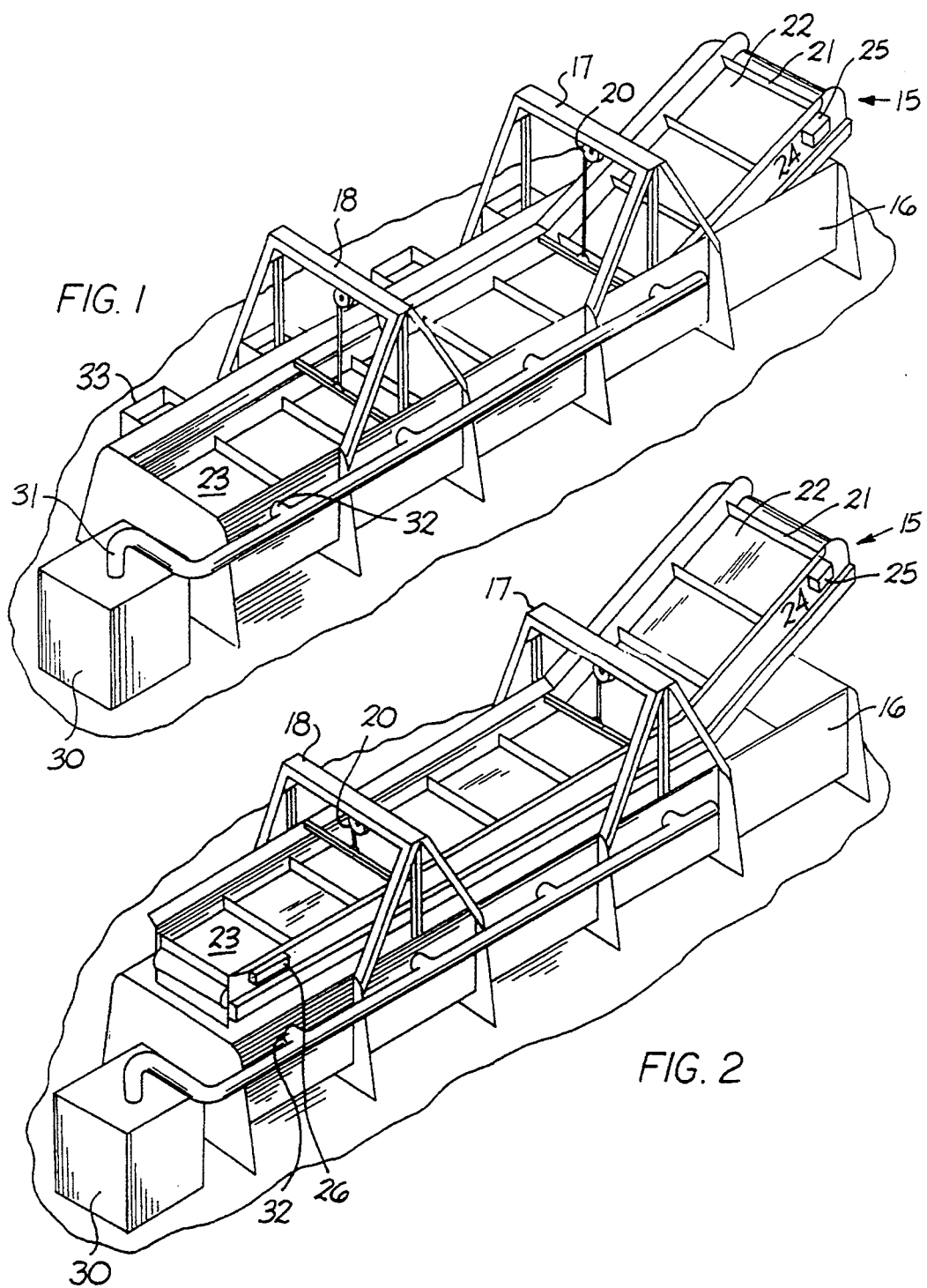

CONVEYOR SYSTEM FOR CHILLING FOOD PRODUCTS

TECHNICAL FIELD

This invention relates to quick cooling of hot steam cooked food products such as lobsters, shrimp or vegetables, and more particularly it relates to conveyor systems for passing the hot products through a liquid shower or bath, preferably water, of controlled temperature.

BACKGROUND ART

Although the art of using refrigerants for freezing food products is highly developed, it is not commercially adaptable for quickly cooling hot cooked products as they come from a cooker. Thus, in cooling hot steam cooked products such as lobster, shrimp or vegetables directly as they come from a cooker, water or water spray has been extensively used. Water is a preferred medium with good heat transfer characteristics affording easy control of temperature of incoming water by chilling. Thus hot products immersed in water are quickly cooled, but the heat is transferred to the water making the cooling less efficient as the water temperature goes up.

it thus becomes desirable to have a chilled water stream passing stationary hot products to reduce the cooling time. In the prior art cooling is achieved with more thermal efficiency in the water cooling system by means of transporting hot products with a conveyor belt upstream in a water flow path towards the incoming chilled water so that the hotter products are partly cooled by the relatively warm part of the water stream heated by the products being cooled, and are transported toward the cooler water source as they become cooler. However this system increases the time taken for the cooling process because the warmer water does not transfer as much heat from the hot product as cooler water would. To provide a lower average time for chilling the hot products passing through a water bath on a conveyor, the conveyor capacity would have to be made greater by widening or lengthening the conveyance path and increasing the product flow rate. However, this would not be adaptable for use in plants with lower product volume or more modest cooked product output rates. Furthermore, the cost of rechilling the warmer water in a recirculating system is substantial, since the warmer water must be processed in a system that changes water temperature many degrees.

Accordingly it is a general object of this invention to provide a more efficient system for chilling hot food products taken directly from a cooker.

A more specific object of this invention is to provide a food product chilling system for conveying hot products through a water shower or bath that more quickly cools the products.

Another object of the invention is to provide a system for chilling hot food products in a water shower or bath that recirculates the water through a chiller at higher efficiency than prior art systems.

Further objects, features and advantages of the invention will be found throughout the following description, claims and appended drawings.

DISCLOSURE OF THE INVENTION

The food chiller of this invention provides a conveyor module inserted in a longitudinally disposed water tank for receiving hot food products at an inlet end and discharging chilled food products at an outlet end. Warmer water discharged from the tank is recirculated and rechilled through a heat exchanger system. The water tank is provided with a plurality of local water flow systems along its length to input chilled water, flow it over the product and remove the water warmed from the product. The water flows in a path transverse to the conveyance of products through the tank. Each of these local flow systems is provided with a water flow path that provides colder chilled water to the product which flows through the conveyor belt, so that at the multiple stations along the length of the belt, cold water chills the product, thereby to provide a much faster cooling cycle than provided by prior art systems.

Furthermore this system provides an efficient chilling system for the recirculated water because the "warmer" water being recirculated is only required to be warmed by a few degrees, typically two degrees Fahrenheit, and thus can be more efficiently rechilled in a refrigerating heat exchanger than the much warmer water that would be removed from prior art systems.

The chilling system is provided with a modular conveyor unit that is disposed in the water chilling tank to carry the products through water from the inlet end to a discharge end. A framework disposed above the tank permits the conveyor belt modular unit to be lifted out of the tank for cleaning and servicing.

A system of weirs is provided along the length of the water tank at each of the stations for flowing chilling water. The water flows transverse to the conveyance path and thus may be individually regulated for optimized flow rates at the respective stations. Thus, for any particular configuration of product characteristics and feed rate with conveyance speed through the tank, the chilling process may be optimally adjusted. Thus, for example, the efflux temperature of the transverse flow paths may be kept substantially uniform and constant along the length of the tank at a specified temperature rise of a few degrees.

These features of the invention are described in more detail hereinafter with reference to the appended drawings.

THE DRAWINGS

In the accompanying drawings, wherein like reference characters refer to similar features throughout the various views for ease in comparison:

FIG. 1 is a perspective sketch of the water chilling tank and conveyor system afforded by this invention with the conveyor module in place for conveying the hot products under water;

FIG. 2 is a perspective sketch of the water chilling tank and conveyor system with the conveyor module lifted out of the water for servicing;

THE PREFERRED EMBODIMENT

Figure 3:
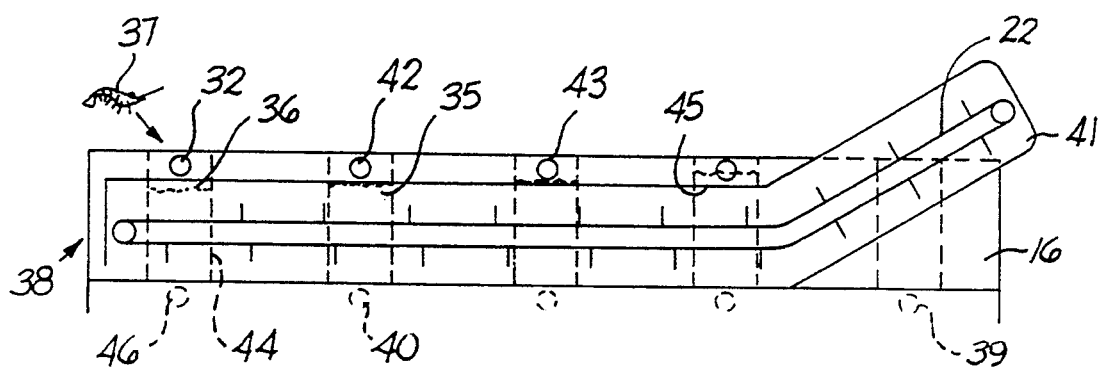
FIG. 3 is a schematic side section view sketch of the system of FIG. 1.

As may be seen in FIGS. 1 and 2, a self contained modular conveyor unit 15 may rest in the position of FIG. 1 to carry food products through water in the elongated tank 16. In FIG. 2 however the conveyor unit 15 is lifted out of the water by means of hoists 20 on the superstructure crossbars 17, 18 for cleaning and service. Flights 21 on the conveyor belt 22 carry the product from the product inlet section 23 to the output ramp 24 extending above the water level in the tank. The belt 22 has a perforated web that permits water to flow freely in a vertical direction through the belt and product. Motorized belt drive modules 25 and 26 at one end or each end of the belt provide traction for running the belt at various speeds. Precaution is taken for adapting the drive module 26, if used at the entrance end to run in an underwater location.

The water circulation pump and chilling system 30, pumps chilled water through piping 31 to various input stations 32, etc. along the length of the tank 16. The chilled water thus flows across the tank, transverse to the conveyor belt path at the various stations along the length of the tank 16, to corresponding output water collection stations 33, etc.

In the section view sketch of FIG. 3, the underwater path of the conveyor belt 22 through the tank 16 is illustrated. The water level 35, 36, etc. covers the belt 22 so that the input products 37, typically lobsters, will be passed through chilled water from the inlet end 38 until they are carried out at the exit end ramp 41. (For products less dense than water, the water level would be set below the level of the conveyed product to prevent floating. Chilled water would be showered on the product in such applications.) Chilled water flows in at upper inlet pipes 32, 42, 43, etc. and warmer water is discharged at exit pipes 39, 40, etc. from the flow path transverse to the travel of the conveyor belt 22.

Figure 4:
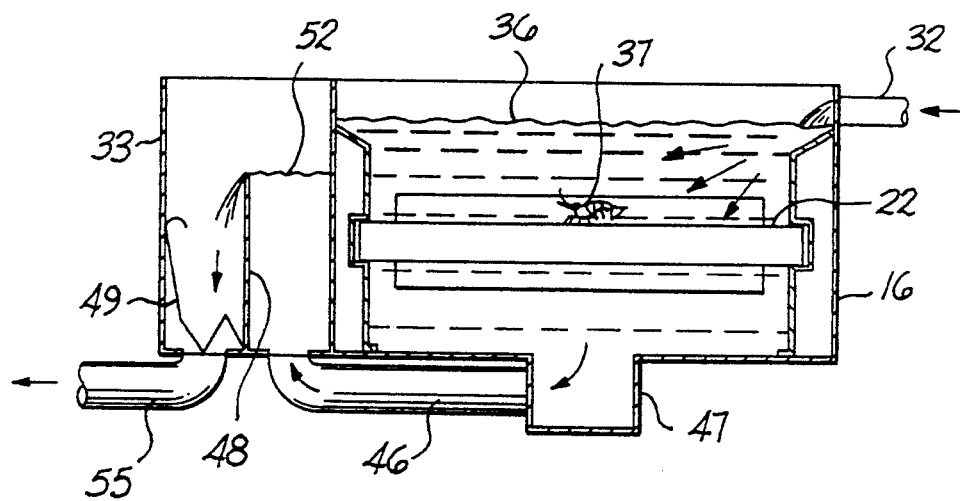
FIG. 4 is a schematic end view section taken through one of the transverse water flow stations disposed along the length of the water tank illustrating the transverse water flow path through the product on the conveyor.
Figure 5:
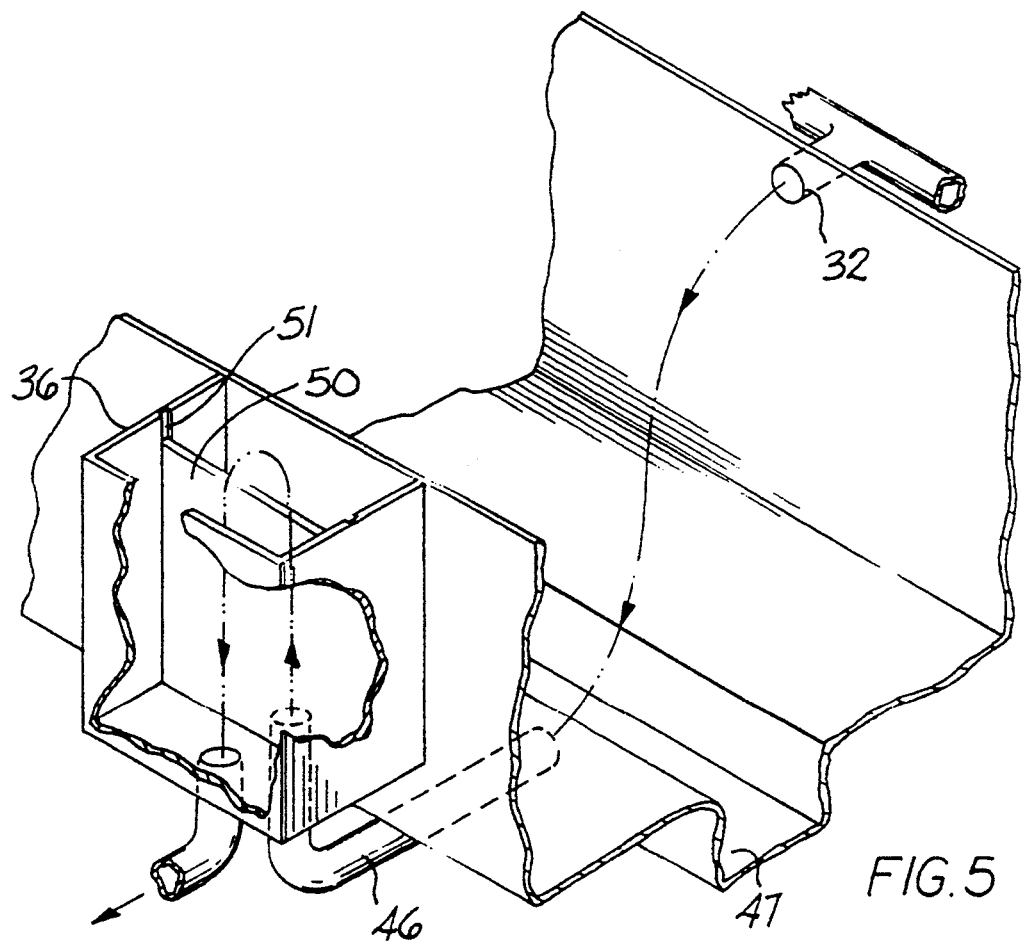
FIG. 5 is a perspective fragmental sketch of the water tank at a transverse water flow station along the length of the water tank.

Note that the water level 36 to 45 is schematically shown as if increasing in height, and phantom lines 44 divide the length of the tank into imaginary compartments. This is explained in connection with the compartmentalized water flow system illustrated in FIGS. 4 and 5. The water tank 16 in cross section shows a lowermost longitudinal channel 47 from which the water outlet pipe 46 extends. Thus the chilled influx water at pipe 32 flows in and downwardly as shown by the arrows through the conveyor belt 22 past the products 37 being chilled, into channel 47 and out the efflux outlet pipe 46 into the water collection station 33. The efflux water is warmed, typically about two degrees Fahrenheit, by heat transfer from the hot steam cooked product 37 coming directly from the cooker at the input end 38 of the chilling tank.

In the water collection station 33, a weir 48 of adjustable height is obtained, for example, by stacking a series of vertically stacked slats 50 registered in grooves 51. This establishes a head 52 against which water flows, thus influencing the flow rate and the dynamic level 36 in the main tank water level in the imaginary compartments controlled by the individual transverse flow stations. Accordingly, the weirs can be adjusted, for example, to maintain the temperature of the efflux water at each of the efflux pipes 46, 40, 39, etc. substantially constant for a given product and conveyor speed. Thus, the weirs 48 may be adjusted along the length of the water tank 16 for different water level heads, as illustrated by water level notation 36, 35, 45 in FIG. 3. In this way the system may be optimized for more quickly chilling the hotter input product where a faster water flow (lower head) is provided at the product input end 38 of the water tank 16 where the product is hottest. At the ramp 41 product output end after the product is chilled the water level head is higher so that the flow rate is reduced. The screen 49 is provided to keep efflux water from carrying any product residue into the recirculation system from the conduit pipe 55.

In this style of operation, there are advantages from the transverse flow of chilling water through the tank with respect to the direction of belt travel because of the relative turbulence in the water which accelerates the chilling of the product. Also system conditions are widely adaptable to various products and chilling requirements by means of controls of belt speed, water recirculation rates, weir heights and product input rates.

Figure 6:
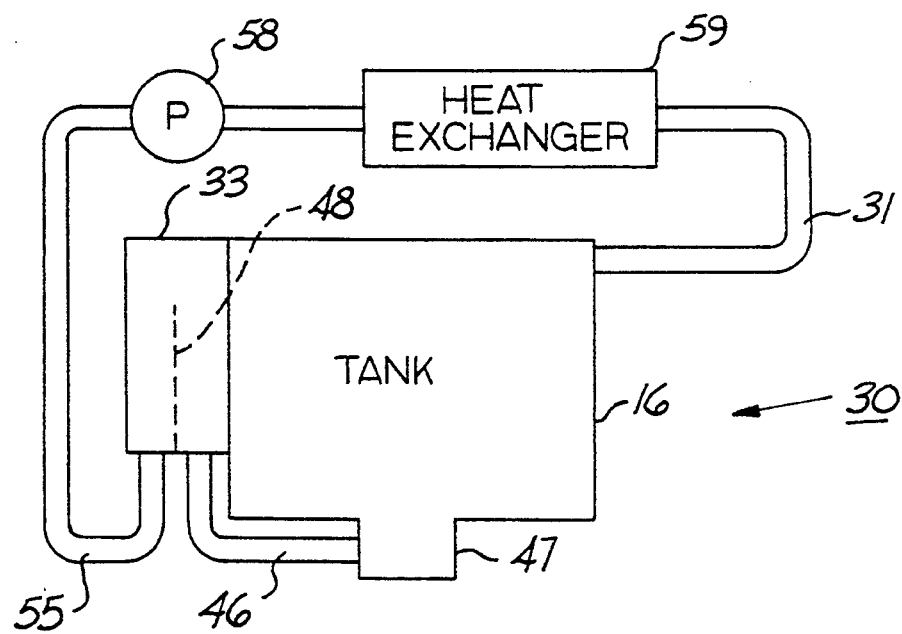
FIG. 6 is a schematic block diagram of the water chilling and recirculation system afforded by this invention.

As seen from the system diagram of FIG. 6, a significant advantage of the transverse flow system 30 for chilling water as provided by this invention is that the heat exchanger 59 is very efficiently operated. Thus, if the efflux water at conduit pipe 55 is warmed by about two degrees from the chilled influx water provided by the heat exchanger 59, a modest thermal exchange in heat exchange cooler 59 can handle a large flow of water from the pump 58. The pump 58 can be adjusted to establish required flow rates to achieve the desired chilled water temperature at influx piping 31. The thermal processing capacity of the heat exchanger 59 is chosen sufficient to chill a given product flow rate on the conveyor belt 22 from its hot condition, typically coming directly from a steam cooker, to the desired exit temperature.

Accordingly this invention improves the state of the art by introducing novel methods and apparatus for quick chilling food products by conveying them through an elongated tank into which a flow of chilling water is passed transversely through the conveyed product at a series of stations along the length of the tank.

Among the advantages and features of this invention are the following:

(a) The simplified system afforded by a modular conveyor belt unit adapted to convey food products through water, together with the superstructure and hoist system which permits the conveyor to be lifted from the water for servicing.

(b) The quick chilling method obtained by operation of a plurality of chilling flow paths in parallel arranged along the length of the conveyor belt transporting the products through water, thereby decreasing the average chilling time of the product in the cooling cycle.

(c) The thermal efficiency of the recirculation water cooling system obtained by the plurality of water flow paths where the efflux temperature is kept within a few degrees Fahrenheit above the influx temperature.

Having therefore advanced the state of the art, those novel features embodying the spirit and nature of the invention are set forth with particularity in the following claims.

We claim:

1. The method of increasing the cooling speed and the thermal efficiency of a system conveying warm food products in a path through a water cooling tank on a movable conveyor belt, comprising the steps of:

recirculating water through the tank transverse to the conveying path at a plurality of stations, establishing a water influx temperature at each of the stations a few degrees Fahrenheit below the food product temperature, and rechilling the water efflux temperature at each station to influx at said water influx temperature.

2. The method of claim 1, further comprising the step of: maintaining the influx temperature at each station uniform.

3. The method of claim 2 further comprising the step of: passing the water efflux from all the stations through a common refrigeration unit.

4. The method of chilling warm food products comprising the steps of:

passing the warm products through water over a longitudinal path through an elongated water tank, and chilling the water in the tank at a plurality of chilling stations disposed along the longitudinal path by flowing chilled input water in a water flow path transverse to the path of the products to flow over the products as a function of the temperature of the products.

5. The method of chilling warm food products comprising the steps of:

passing the warm products through water over a longitudinal path through an elongated water tank, and chilling the water in the tank at a plurality of chilling stations disposed along the longitudinal path by flowing chilled input water in a water flow path transverse to the path of the products as a function of the temperature of the products, wherein the flow rates at different chilling stations are individually controlled.

6. The method of recirculating cooling water through a food product cooler tank that conveys warm food products beneath a body of cooling water, comprising the steps of:

providing the cooler tank with a plurality of water flow paths through food products being processed, collecting the water from said paths and passing it through a heat exchanger for cooling the water, recirculating the cooled water through the water flow paths, and controlling the exit temperature of each of the water flow paths to maintain a substantially uniform temperature increase through the respective flow paths.

7. The method of claim 6 further comprising the step of passing water at a flow rate through the flow paths that results in a water temperature change of only a few degrees Fahrenheit.

8. A conveyor system for chilling warm food products comprising in combination:

a longitudinally disposed water tank having a water flow channel through its longitudinal dimension, a conveyor belt loop disposable longitudinally in the water tank having product input and output stations and adapted for conveying said products through water in a longitudinal path along the tank from the input station to the output station thereby for chilling of warm products by water in the tank, and a cold water circulation system comprising a sequence of water processing stations along the length of the tank for providing at the respective stations an influx of chilling water to flow over the product at waste influx inlets and flow chilled water in a path transverse the longitudinally disposed conveyor belt in the water tank, said stations further comprising a water efflux outlet adapted to remove water from the tank at higher temperature than that of the influx water through weir structure for establishing a specified transverse water flow rate through each individual station.

9. The conveyor system of claim 1 wherein the conveyor system further comprises:

water tank structure for producing a flow path for cold water from the water influx inlets to the water efflux outlets which flow path passes downwardly through the conveyor belt to cool products being transported by the conveyor belt.

10. The conveyor system of claim 1 wherein the weir structure is adjusted to establish higher water flow rates at stations closer to the conveyor belt product input station.

11. The conveyor system of claim 1, comprising a compartment external to said tank containing the weir structure, said weir structure including a plurality of vertically disposed slats adapted to a weir height establishing the rate of flow of cooling water.

12. The conveyor system of claim 1, wherein the conveyor belt comprises a self-contained unit, and the water tank further comprises a plurality of super-structures mounted on the tank supporting a hoist for moving the conveyor belt unit into and out of water disposed in the tank.

* * * * *